HIGH FREQUENCY TRANSISTOR CIRCUIT WITH HEAT SINK

Filed Oct. 21, 1959

INVENTOR

Charles J. Weidknecht,

BY Paris, Haskell and Levine

ATTORNEYS

United States Patent Office 3,074,024

Patented Jan. 15, 1963

3,074,024

HIGH FREQUENCY TRANSISTOR CIRCUIT WITH HEAT SINK

Charles J. Weidknecht, Philadelphia, Pa., assignor to Vector Manufacturing Company, a corporation of Pennsylvania Filed Oct. 21, 1959, Ser. No. 847,814
8 Claims. (Cl. 330—23)

This invention generally relates to improvements in electronic circuitry for handling high frequency alternating current signals and particularly concerns such improvements effective to increase the power handling capacity of electron tubes, transistors and the like, hereinafter referred to as electron valves or valves, and providing the advantages, among others, of reducing the size, weight, and complexity of the circuits.

In constructing electronic amplifiers, transmitters, buffers, and similar circuitry employing electron valves, the size and weight of the overall equipment is to a great extent determined by the size and weight of the valves which in turn, as presently manufactured, greatly increase in size with increased power ratings. One of the important reasons for this rapid increase in valve size that is somewhat out of proportion to the increase in power handling capability is the relatively inefficient way in which presently designed valves are cooled or constructed to dissipate heat. Among the various techniques, there is provided the liquid cooled varieties of valves wherein cooling fluid is circulated in a bath about the valve body or portions thereof to receive and carry away the heat. Another technique is to provide a multiple fin structure located outside the valve envelope and connected to the plate or other power carrying electrode to dissipate the heat by radiation. In some instances such fins alone are not adequate for cooling the tube and a motor driven fan is used to circulate air over the fins to enhance the cooling.

Obviously, such cooling techniques are not the most efficient means for cooling the valve from a heat transfer standpoint and a considerably more effective technique for doing so would be to directly connect the power handling element or electrode of the valve to a large heat sink such as the chassis of the circuit and thereby more effectively cool the valve by means of conduction.

To obtain this desired and improved cooling function according to the present invention, there is provided a unique manner of electrically interconnecting the circuit elements of a high frequency electronic amplifier or related circuit whereby the power carrying element or electrode of the valve may be connected directly to a heat sink chassis and thereby convey the heat away from the electrode both rapidly and efficiently. However, in order to provide this function, the plate or other power carrying electrode must also be grounded with respect to both the alternating current and direct current signals and power being handled by the valve with the result that known amplifier and related circuit configurations cannot be so connected and function properly at high frequencies. According to the present invention this grounded power electrode configuration is made possible by interconnecting the circuit elements in such manner that the input and output circuits are decoupled and properly isolated from the D.-C. power sources thereby to permit proper functioning of the circuit despite the grounded power element connection.

It is accordingly a primary object of the invention to provide a high frequency electronic circuit having components of standard size and weight interconnected to handle increased power without the need for auxiliary cooling equipment.

A further object is to reduce the size and weight of an electronic circuit employing standard and available valves and components.

Another object is to provide an electron circuit configuration having valves whose power carrying element is physically and electrically grounded to a chassis to provide conduction cooling thereof.

Other objects and many additional advantages will be more readily understood by those skilled in the art after a detailed consideration of the following specification taken with the accompanying drawing wherein.

Figures 1, 2:
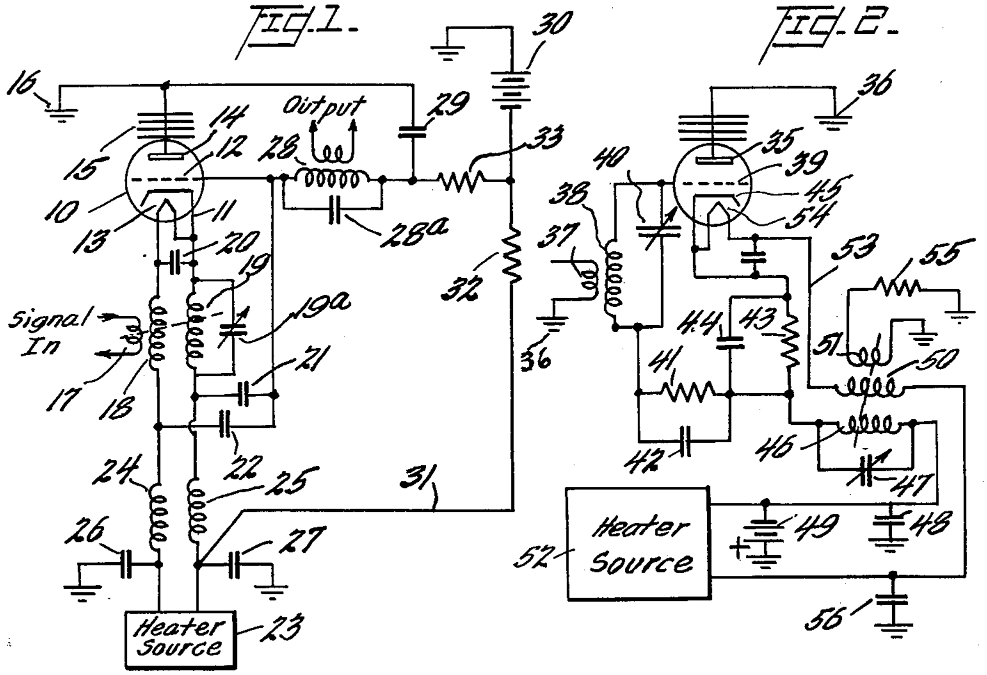
FIG. 1 is an electrical schematic diagram illustrating a common grid electron tube amplifier circuit embodying the present invention.
FIG. 2 is an electrical schematic diagram similar to FIG. 1 and illustrating the invention incorporated in a common cathode amplifier circuit.

Referring now to FIG. 1 for a detailed consideration of one embodiment incorporating the invention, there is shown a high frequency amplifier circuit comprising a single high vacuum electron tube 10 having a cathode electrode 11, a grid electrode 12, a cathode heater 13, and a plate electrode 14. This tube may be of a well known variety commonly available on the open market and known as a planar power triode for high frequency applications and being provided with an array of heat radiating fins 15 connected to the plate electrode, as generally shown, for dissipating the heat.

In the customary use of this type tube as an amplifier or in a related circuit, the plate electrode 14 is energized at both D.-C. and A.-C. potentials far above ground and becomes quite hot as a result of the bombardment of electrons flowing from the cathode element 11. Consequently the fin structure 15 is used to radiate the heat being generated, and a motor driven fan may also be used to circulate cooling air past the fins 15 to aid in removing the heat. However, according to the present invention, the fins 15 are physically and electrically directly connected by soldering or otherwise to the chassis structure, illustrated by the ground symbol 16, with the result that the complete chassis for housing and supporting all components of the circuit serves as a large heat sink directly connected to the plate element 14 to conduct away the heat much more efficiently and rapidly than before. Consequently, by grounding the power handling electrode of the tube 10, the tube may function to control a flow of power many times greater than its rated capacity, or in other words a much smaller power triode may be used for a given application than heretofore with the result that the overall circuit may be considerably reduced in size and weight over known power amplifying configurations, not to mention the further size and weight savings effected by eliminating the need for a motor driven fan commonly used for cooling the fins 15.

Returning to FIG. 1 for any understanding of the unique circuit configuration permitting the plate electrode 14 to be grounded to the chassis, the alternating current signal paths will first be described. The input signal is introduced to the primary winding 17 of an input transformer having secondary windings 18 and 19 that are connected in each leg leading to the heater element 13. The upper terminals of each secondary 18 and 19 are connected together by a capacitor 20 which provides a short circuit therebetween at the high frequency of the input signal but provides a high reactance insofar as the lower frequency heater currents are concerned. The lower terminals of each secondary are also connected together by capacitors 21 and 22 which possess a low reactance at the high frequency of the input signal, but a high reactance at the much lower frequency of the heater source 23. The cathode element 11 is connected to the heater lines, as shown, and the capacitors 21 and 22 further serve to connect the lower terminals of the secondary windings 18 and 19 to the grid element. As thus far described, therefore, it is evident that the high frequency input signal is introduced between the cathode element 11 and grid element 12 to control the flow of electrons through the vacuum tube 10.

To isolate the input signal from entering the heater source thereby to substantially eliminate the stray capacity to ground that would otherwise short circuit the secondary windings 18 and 19, there is provided choke coils 24 and 25, respectively, one in each line of the heater connector leading to the heater source 23. These chokes 24 and 25 in cooperation with capacitors 26 and 27 having one side grounded form an effective filter preventing the high frequency input signal from entering the heater source and being grounded by stray capacity.

On the other hand, the choke coils 24 and 25 as well as the secondary windings 18 and 19 possess very low impedance at the frequency of the heater source 23 whereby the heater current passes through these elements in a continuous path to the heater 13 to energize the filament 13 of tube 10.

Considering the A.-C. output circuit of the tube 10, the primary winding of tuned output transformer 28 has its left hand terminal connected through capacitors 21 and 22 to the cathode circuit, since the reactance of capacitors 21 and 22 is extremely low at the high frequency involved. The right hand terminal thereof is connected to the grounded plate element 14 through a capacitor 29 also having negligible reactance at high frequency whereby it is evident that the primary winding of output transformer 28 is connected across the tube from plate electrode 14 to cathode electrode 11 and is energized according to the A.-C. signal output of the tube 10.

Considering the direct current circuit paths for energizing the tube, the positive terminal of the D.-C. supply 30 is directly connected to chassis, as shown, thereby energizing the plate element 14, also grounded as discussed above. From the plate element 14, D.-C. current flows to the cathode 11 and through the transformer winding 19 and choke 25, both of the latter representing substantially no resistance to the flow of direct current. After passing through choke 25, the direct current flows over the D.-C. return line 31 and thence through resistor 32 to the negative terminal of the D.-C. source thereby completing the D.-C. circuit. A direct current bias is also supplied to the grid electrode 12 by connecting the negative terminal of the D.-C. source 30 to the grid circuit by means of resistor 33 as shown.

It is to be particularly noted that this circuit configuration substantially prevents the A.-C. signal from passing through the D.-C. power source 30 or low frequency A.-C. heater source 23 while at the same time preventing the D.-C. current from passing through the output load transformer 28. The former isolation is necessary to prevent the A.-C. signal from being short circuited to ground through stray capacity in the sources 30 and 25, which shorted connection would disable the high frequency circuit and prevent proper operation.

Thus in the circuit illustrated in FIG. 1, there is provided a means for electrically and physically grounding the plate element 14 directly to the chassis for both A.-C., D.-C., and heat transfer purposes enabling the tube 10 to be operated and handle electrical power far above its rated power capacity.

In FIG. 2, there is shown an alternative vacuum tube amplifier circuit configuration, that in common with the embodiment of FIG. 1, also enables the plate electrode 35 to be physically and electrically grounded to the chassis at 36 to provide the advantages discussed above.

In this alternative circuit configuration, the components are connected differently to provide what might best be termed a common cathode type amplifier. Tracing the A.-C. input signals, the high frequency input is introduced to the primary winding 37 of an input transformer, one side of which is grounded to the chassis. The secondary winding 38, tuned by capacitor 40, has its upper terminal connected to the grid element 39 and its lower terminal connected through a resistor 41 and parallel capacitor 42 combination to a biasing paralleled resistor 43 and capacitor 44 whose opposite terminal is connected to the cathode electrode 45. As thus far described, therefore, the input signal is coupled across the control grid 39 and cathode 45 through suitable self-biasing means.

In the A.-C. signal output circuit, the primary winding 46 of an output transformer, tuned by a variable capacitor 47, is connected between the cathode element 45 and ground 36 through a capacitor 48 of low reactance at the high frequency on one side and through the biasing resistor 43 and capacitor 44 on the other side. The cathode 45 in turn receives A.-C. current from the plate electrode 35 which is physically and electrically grounded to the chassis 36. Thus an A.-C. signal output circuit may be traced from ground 36 and through the tube from plate 35 to cathode 45, thence through parallel resistor 43 and capacitor 44 and through the primary winding 46 and finally through capacitor 48 and back to ground 36. The capacitor 48 also provides an A.-C. shunt path across the D.-C. potential 49, thereby preventing the A.-C. signal from passing through the D.-C. source 49 or heater source 52.

The output transformer is provided with two secondary windings 50 and 51, with winding 50 being connected in the line 53 leading between the heater source 52 and the heater element 54 of the tube, and with the secondary 51 being connected to energize a load, generally indicated as resistor 55. The secondary winding 50 in the heater line 53 serves to introduce an A.-C. bucking signal in the line 53 which prevents the transmission of the A.-C. signal to the heater source. An A.-C. by-pass capacitor 56 also connects the heater line 53 to ground 36 for high frequency A.-C. signals to prevent any signal that succeeds in passing through secondary winding 50 from reaching the heater source 52.

Figures 3, 4:
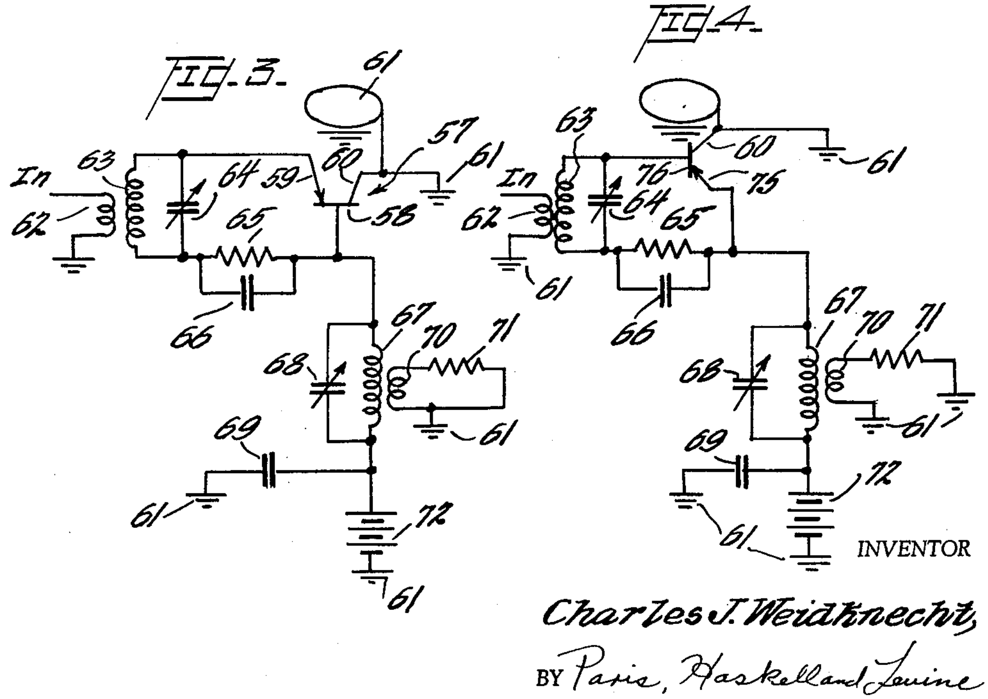
FIGS. 3 and 4 are electrical schematic diagrams illustrating the invention used with transistor valves in a common base and common emitter configurations, respectively.

In FIG. 3, there is shown another circuit embodiment of the present invention and employing a multi-element transistor 57 having a base element 58, an emitter element 59, and a collector element 60 all being connected in a common base type configuration. In common with the high vacuum tube circuits of FIGS. 1 and 2, this circuit also possesses improved power handling capacity by connecting the power handling element, in this case the collector element 60, to a heat sink chassis 61 both physically and electrically. Tracing through the A.-C. signal, the high frequency input signal is introduced at the primary winding 62 of an input transformer having one terminal thereof being grounded, and is applied across the base element 58 and emitter element 59 by means of a transformer secondary winding 63, tuned by a variable capacitor 64, as shown. For biasing the transistor, there is provided in series circuit relation with the secondary winding 63, a parallel resistor 65 and capacitor 66 combination.

In the A.-C. output circuit, the primary winding 67 of an output transformer, tuned by a variable capacitor 68, is connected at one side to ground through a by-pass capacitor 69 and at the other side to the base element 58 and through the circuitry discussed above to the emitter element 59. Consequently the A.-C. signal passing through the transistor energizes the primary winding 67 which in turn transmits the signal to a secondary winding 70 for energizing a load 71.

In the direct current circuit, the positive terminal of a D.-C. source 72 passes current through winding 67 and through resistor 65 and secondary winding 63 to the transistor emitter element 59. From the emitter, the D.-C. current passes to the collector element 60 and thence to chassis ground 61 which forms a return path to the negative terminal of the D.-C. energizing source 61 and completes this D.-C. path.

As in the vacuum tube circuits of FIGS. 1 and 2, the A.-C. circuit and D.-C. circuits are decoupled by means of a by-pass capacitor 69 whereby the high frequency A.-C. signal does not enter the D.-C. source.

In FIG. 4 there is provided still another modification of the present invention which is substantially identical to that of FIG. 3 with the sole exception that the electrical connections to the base element 76 and emitter element 76 are reversed to provide a common emitter type of connection. In all other respects, the circuit elements are the same and interconnected in the same manner. However, it is believed evident that the values of the circuit elements will vary to provide the different biasing needed, and that the gain and characteristics of the circuit will differ from that of FIG. 3. With respect to the present invention, however, the result is substantially the same since the circuit permits both the physical and electrical grounding of the power carrying collector element 60 to provide the substantial improvement in power handling capacity as discussed above.

It is evident that relatively few of the many possible circuit configurations have been illustrated and described herein and accordingly many modifications may be made by those skilled in the art without departing from the spirit and scope of the invention. Accordingly this invention should be considered as being limited only by the following claims.

What is claimed is:

1. A high frequency transistor circuit comprising a transistor having base, collector and emitter electrodes, a conductor means for directly connecting the collector electrode to a common ground heat sink chassis, thereby to provide a common ground at the chassis for alternating current and direct current and to provide direct heat conduction from the collector to the heat sink, an ungrounded circuit interconnecting the base and emitter electrodes to convey alternating current input signals therebetween, and an output circuit interconnecting one of said base and emitter electrodes with said chassis to obtain amplified alternating current output signals, means for conveying direct current energization between said chassis and said one of the base and emitter electrodes and being decoupled from said output circuit such that substantially no alternating current flows through said direct current conveying means, and means for conveying direct current biasing between said base and emitter electrodes, said biasing means consisting solely of a resistance means in series circuit relationship between said base and emitter electrodes and a capacitor means to by-pass alternating current from flowing through said resistance means, thereby to prevent degeneration of the alternating current between said base and emitter electrodes.

2. In the high frequency transistor circuit of claim 1, an input transformer having a primary and secondary winding, said primary winding being energizable by an input signal and having one terminal thereof connected to common ground, and said secondary winding being connected in the ungrounded circuit interconnecting the base and emitter electrodes.

3. A high frequency transistor circuit comprising a transistor having base, collector and emitter electrodes, a conductor means for directly connecting the collector electrode to a common ground heat sink chassis, thereby to provide a common ground at the chassis for alternating current and direct current and to provide direct heat conduction from the collector to the heat sink, an ungrounded circuit interconnecting the base and emitter electrodes to convey alternating current input signals therebetween, and an output circuit interconnecting said emitter electrode with said chassis to obtain amplified alternating current output signals, means for conveying direct current energization between said chassis and said emitter electrode and being decoupled from said output circuit such that substantially no alternating current flows through said direct current conveying means, and means for conveying direct current biasing between said base and emitter electrodes, said biasing means consisting solely of a resistance means in series circuit relationship between said base and emitter electrodes and a capacitor means to bypass alternating current from flowing through said resistance means, thereby to prevent degeneration of the alternating current between said base and emitter electrodes.

4. In the high frequency transistor circuit of claim 3, an input transformer having a primary and secondary winding, said primary winding being energizable by an input signal and having one terminal thereof connected to common ground, and said secondary winding being connected in the ungrounded circuit interconnecting the base and emitter electrodes.

5. A high frequency transistor circuit comprising a transistor having base, collector and emitter electrodes, a conductor means for directly connecting the collector electrode to a common ground heat sink chassis, thereby to provide direct heat conduction from the collector to the heat sink, an ungrounded circuit interconnecting the base and emitter electrodes to convey alternating current input signals therebetween, and an output circuit interconnecting said base electrode with said chassis to obtain amplified alternating current output signals, means for conveying direct current energization between said chassis and said base electrode and being decoupled from said output circuit such that substantially no alternating current flows through said direct current conveying means, and means for conveying direct current biasing between said base and emitter electrodes, said biasing means consisting solely of a resistance means in series circuit relationship between said base and emitter electrodes and a capacitor means to by-pass alternating current from flowing through said resistance means, thereby to prevent degeneration of the alternating current between said base and emitter electrodes.

6. In the high frequency transistor circuit of claim 5, an input transformer having a primary and secondary winding, said primary winding being energizable by an input signal and having one terminal thereof connected to common ground, and said secondary winding being connected in the ungrounded circuit interconnecting the base and emitter electrodes.

7. A high frequency circuit for amplifying alternating current signals comprising: an electron valve having at least three electrodes, with a first and second of said electrodes constituting power electrodes for the passage of greater current flow therebetween and the third electrode passing a lesser current and functioning to regulate current flow between the first and second electrodes, the greatest amount of heating being produced at said first electrode, a conductor means for directly connecting the first electrode to a common ground heat sink chassis, thereby to provide a common ground at the chassis for alternating current and direct current and to provide direct heat conduction from the first electrode to the heat sink, an input circuit interconnecting the second and third electrodes to convey alternating current input signals therebetween, said input circuit being isolated from said common ground for both alternating current and direct current signals, and an output circuit interconnecting said chassis and said second electrode to obtain amplified alternating current output signals, means for conveying direct current energization between said chassis and said second electrode and being decoupled from said output circuit such that substantially no alternating current flows through said direct current conveying means, and means for conveying direct current biasing between said second and third electrodes, said biasing means consisting solely of a resistance means in series circuit relationship between said second and third electrodes and a capacitor means to by-pass alternating current from flowing through said resistance means, thereby to prevent degeneration of the alternating current between said second and third electrodes.

8. In the high frequency circuit of claim 7, an input transformer having a primary and secondary winding, said primary winding being energizable by an input signal and having one terminal thereof connected to common ground, and said secondary winding being connected in the circuit interconnecting said second and third electrodes and being isolated from said common ground.

References Cited in the file of this patent

UNITED STATES PATENTS

| | | |
|---|---|---|
| 2,784,262 | Crow | Mar. 5, 1957 |
| 2,810,071 | Race | Oct. 15, 1957 |
| 2,839,620 | Waldhauer | June 17, 1958 |
| 2,881,269 | Hanel | Apr. 7, 1959 |
| 2,946,015 | Byles | July 19, 1960 |

OTHER REFERENCES

Garner: "Transistor Guitar Amplifier," Radio and Television News, November 1953, pages 74, 75 (only pages 74 and 75 relied on).

Mullard: "Transistor High Gain Preamplifier," Proc. IRE, Australia, April 1957, page 112.

Palmer: "Transistor Intercom System," Radio and TV News, July 1957, pages 94 and 95.